United States Patent
Le Roux et al.

(10) Patent No.: US 7,978,687 B2
(45) Date of Patent: Jul. 12, 2011

(54) METHOD FOR CONTROLLING ROUTING IN A PACKET NETWORK SUPPORTED BY A TRANSPORT NETWORK

(75) Inventors: Jean-Louis Le Roux, Lannion (FR); Géraldine Calvignac, Trebeurden (FR)

(73) Assignee: France Telecom, Paris (FR)

( * ) Notice: Subject to any disclaimer, the term of this patent is extended or adjusted under 35 U.S.C. 154(b) by 686 days.

(21) Appl. No.: 11/658,771

(22) PCT Filed: Jun. 17, 2005

(86) PCT No.: PCT/FR2005/001513
§ 371 (c)(1),
(2), (4) Date: May 22, 2008

(87) PCT Pub. No.: WO2006/021631
PCT Pub. Date: Mar. 2, 2006

(65) Prior Publication Data
US 2009/0040943 A1 Feb. 12, 2009

(30) Foreign Application Priority Data
Jul. 27, 2004 (FR) .................................. 04 08268

(51) Int. Cl.
*H04L 12/66* (2006.01)
(52) U.S. Cl. ........................................ 370/352; 370/401
(58) Field of Classification Search .................. None
See application file for complete search history.

(56) References Cited

U.S. PATENT DOCUMENTS 5,854,899 A * 12/1998 Callon et al. .................. 709/238
6,275,470 B1 * 8/2001 Ricciulli ........................ 370/238

FOREIGN PATENT DOCUMENTS

WO WO 03/019870 A 3/2003
WO WO 2004/034653 A 4/2004

OTHER PUBLICATIONS

Guerin et al., "QoS routing mechanisms and OSPF extensions", Global Telecommunications Conference, 1997. Globecom '97, vol. 3, Nov. 3-8, 1997.
Lee, "Topology Aggregation for Hierarchical Routing in ATM Networks" Computer Communication Review, Association for Computing Machinery, vol. 25, No. 2, pp. 82-92, Apr. 1, 1995.

* cited by examiner

*Primary Examiner* — Chirag G Shah
*Assistant Examiner* — Minh-Trang Nguyen
(74) *Attorney, Agent, or Firm* — Cohen Pontani Lieberman & Pavane LLP

(57) ABSTRACT

A method of controlling routing in a packet network supported by a transport network allowing the dynamic creation/suppression of links for transporting packets of said packet network, said method including a routing step, a step of informing other routers of said network of the metric assigned to each link of the packet network, and a step of creating/destroying a link. The link may have three states: a non-connected state if said two routers cannot be directly connected, a virtual connection state wherein a virtual metric is assigned to said link between said head end router and said tail end router of the same communication, and a real connection state wherein a real metric is normally assigned to said link.

12 Claims, 4 Drawing Sheets

METHOD FOR CONTROLLING ROUTING IN A PACKET NETWORK SUPPORTED BY A TRANSPORT NETWORK

RELATED APPLICATIONS

This is a U.S. National Phase Application under 35 USC 371 of International Application PCT/FR2005/001513 filed on Jun. 17, 2005.

FIELD OF THE INVENTION

The present invention relates to a method of controlling routing in a packet network supported by a transport network allowing the dynamic creation/suppression of links for transporting packets of said packet network. It also relates to a routing control system, to a dynamic routing control unit, and to an adjacency management unit for implementing said routing control method.

BACKGROUND OF THE INVENTION

A network that transfers packets bearing information and provides functions for routing those packets is called a packet network. The packets in question in the present description are IP (Internet Protocol) packets, for example. The present invention applies particularly to a packet network which has a structure conforming to the overlay model, one example of which is represented in FIG. 1 and comprises routers, for example four routers A, B, C, and D, connected to each other by a core transport network 10, for example an optical transport network, including optical cross-connect units OXC1 to OXC4 through which packets processed by each router A, B, C, D can pass in transit. A client-network interface UNI provides logical control between a router and the core network.

More precisely, the present invention applies to a network with an architecture conforming to the overlay model in which the packet domain (for example the IP domain) is relatively independent of the core transport network domain (for example the optical domain). The core network provides connections that are seen from the packet network as point-to-point connections. The packet network acts as a client vis-à-vis the core network. Moreover, the routing protocol of the packet network and that of the core network are independent.

The interface between a router and a cross-connect unit of the core network 10 is a logical control interface that provides for sending signaling messages between an edge router and the optical cross-connect unit of the optical network to which it is connected for the purposes of creating, destroying, modifying, and requesting the status of optical circuits of the optical network. It may be an Optical-User Network Interface (O-UNI) between an IP packet network and an optical transport network, such as those defined by the standardization organizations OIF (Optical Internetworking Forum) and IETF (Internet Engineering Task Force). Under such circumstances, the protocol on which the signaling messages are based is the Resource Reservation Protocol—Traffic Engineering (RSVP-TE).

A packet-switching network generally uses a routing protocol with the essential function of determining the least costly path (also called the shortest path) for packets passing in transit from one router to another, given that a cost, also called a metric, is assigned to each link from one router to another to which it is connected. This applies to an IP network. The routing protocol referred to here is a link state routing protocol, for example of the interior type, such as a protocol of the IGP (Interior Gateway Protocol) link state type, such as in particular the OSPF (Open Shortest Path First) protocol. This is covered by Request For Comments 2328 (RFC 2328) in particular. The routing protocol could equally be the ISIS (Intermediate System to Intermediate System) protocol defined in particular in Request For Comments 3784 (RFC 3784).

The operating principle of an IGP link state type protocol is as follows. Each adjacency of the IP network, which the protocol can determine for itself by means of a particular protocol called the Hello protocol, is associated with a metric of value that represents a characteristic of the adjacency: an arbitrary value assigned by the administrator of the network (for example a value of 1 representing a router that is passed through in transit, the transmission delay on the link concerned, the reliability of the link, etc.). The metric may also be referred to as the cost of the link concerned. The protocol then calculates the routes to all of the routers of the network using a SPF (Shortest Path First) algorithm, the length (or the cost) of a path being determined by summing the metrics of the links forming that path.

The present invention therefore relates only to the packet network which, in an embodiment to be described, is an IP network using a link state routing protocol, for example of the IGP link state type.

The term adjacency refers to a link between two routers that have become neighbors to exchange routing information, i.e. that are neighbors not only because they each have an interface to the same network, but also because they have synchronized their respective topology tables.

The control capacities offered by a link state routing protocol, such as the IGP protocol, are not adequate for the purposes of traffic engineering (TE). Because Shortest Path First (SPF) routing algorithms are optimized on the basis of simple metrics, they fail to take into account traffic and bandwidth availability characteristics in arriving at their routing decisions. Thus congestion can occur if the shortest paths of a plurality of traffic streams converge on the same links or the same routers or if a traffic stream converges on a link or a router that does not have sufficient bandwidth to support it.

The overlay model described above with reference to FIG. 1 solves some of those problems by creating virtual topologies on top of the physical topology of the packet network. A virtual topology consists of virtual circuits that look like physical links to the routing protocol. In this way, traffic and resource control can be envisaged at the level of the virtual topology.

One example of this superposition of a virtual topology is to have the packet network support an optical transport network providing traffic engineering for it. The paper "Distributed Virtual Network Topology Control Mechanism in GMPLS-Based Multiregion Networks", IEEE Journal on Selected Areas in Communications, vol. 21, no. 8, pp. 1254-1262, October 2003, K. Shiomoto et al. describes a method of dynamically reconfiguring the virtual network topology (VNT) which is distributed (i.e. which includes no centralized coordination in the execution of the reconfiguration of the network) and which consists essentially in the use of a link state routing protocol (of the IGP type referred to above) so that each node shares the same virtual topology and a traffic demand on the individual optical paths, which traffic is measured at the source node. The link state routing protocol is used to disseminate information relating to the virtual topology and information relating to the traffic demand on the optical path. Each node calculates the new topology and compares it with the current topology to identify optical paths that should be activated/deactivated. If that node is the source node of the optical path, the activation/deactivation procedure is applied. When each node has acted in this way, the VNT is reconfigured and the IP traffic is rerouted over the new topology.

The algorithm for calculating the new topology adds new optical paths in order to limit the possibility of congestion, given the traffic, and eliminates any optical path that is under-used. Two traffic thresholds (a higher threshold and a lower threshold) are respectively defined for optical paths that are congested and for optical paths that are under-used. If the traffic demand on an optical path is above the upper threshold, a new optical path is created so that traffic on the congested optical path can be rerouted. The end nodes of the new optical path are selected from all the adjacencies of the end nodes of the congested link. In contrast, if the traffic demand on an optical path is below the lower threshold, that optical path is suppressed, provided that this does not cause congestion.

More precisely, the document referred to here describes a method of dynamic virtual distributed reconfiguration of the topology of Internet Protocol (IP) packet networks supporting MPLS-TE switching or GMPLS switching (Generalized MPLS: see Requests For Comments RFC 3471 et seq.) on wavelength division multiplex (WDM) optical networks. This method is a mechanism which decides to set up or to suppress optical circuits of the WDM network as a function of the traffic load on TE-LSP type paths.

Thus the above document describes the dynamic updating of the topology of a network as a function of the traffic matrix.

The mechanism that is described in the document referred to above nevertheless has the drawback of not offering mechanisms capable of monitoring the impact on the routing protocol of link creation/destruction. In fact, it has been shown that this impact creates topology instabilities and leads to excessively frequent changes. It may even result in congestion or under-use of certain links.

SUMMARY OF THE INVENTION

An object of the present invention is to control the topology of a packet network supported by a transport network allowing the dynamic creation/suppression of links for transporting packets of said packet network that does not have the drawbacks of the prior art methods such as that described in the document referred to above.

This and other objects are attained in accordance with one aspect of the present invention directed to a method of controlling routing in a packet network supported by a transport network allowing the dynamic creation/suppression of links transporting packets of said packet network, said method comprising:

a routing step which, as a function of a metric assigned to each link of the packet network, determines the shortest path between said head end router and the tail end router of the same connection;

a step of informing the other routers of said network of the metric assigned to each link of the packet network; and a step of creating/destroying a link or a connection between said head end router and the tail end router of the same communication if the shortest path uses said link and the traffic between said two routers fulfills creation/destruction conditions.

According to an essential feature of the invention, said link may assume three states:

a non-connected state if said two routers cannot be connected directly;

a virtual connection state wherein a virtual metric is assigned to said link between said head end router and said tail end router of the same communication, said virtual connection state being assumed if said link can be connected directly and the traffic between said two routers does not fulfill said creation/destruction conditions, said virtual metric then being reported to the other routers as an undifferentiated metric; and a real connection state in which a real metric is normally assigned to said link between said head and router and said tail end router of the same communication, said real connection state being assumed if the traffic between said two routers fulfills said creation/destruction conditions.

According to another feature of the present invention, for the link concerned, the value of the virtual metric is chosen to be either equal to or less than that of the real metric.

According to another feature of the present invention, for the link between two routers concerned, the value of the virtual metric is chosen to be either equal to or less than that of the sum of the real metrics of the indirect paths linking said two routers.

According to another feature of the present invention, a connectivity test is performed if said link is in its virtual connection state.

Another aspect of the present invention is directed to a system for controlling routing in a packet network supported by a transport network allowing the dynamic creation/suppression of links for transporting packets of said packet network. Said system is of the type comprising:

a management unit which, as a function of a metric assigned to each link of the packet network, determines the shortest path between said head end router and the tail end router of the same connection;

a unit for advertising the metric assigned to each link of the packet network to the other routers of said network;

a unit for creating/destroying a link or a connection between said head end router and the tail end router of the same communication if the shortest path uses said link and the traffic between said two routers fulfills creation/destruction conditions; and a unit for dynamically managing the topology of the network.

It is characterized in that said dynamic network topology management unit is adapted to:

command said management unit to create a virtual adjacency and to advertise said virtual adjacency as a link with a virtual metric if said link can be connected directly and the traffic between said two routers does not fulfill said creation/destruction conditions; and command said unit to create a real connection between said two routers and said management unit in order to create a real adjacency and to advertise said real adjacency as a link with a real metric if the traffic between said two routers fulfills said creation/destruction conditions.

Said system for controlling routing in a packet network advantageously includes a connectivity test unit for testing the connectivity of said link.

Similarly the system is such that said management unit includes a real adjacency management unit associated with a real adjacency table and a virtual adjacency management unit associated with a virtual adjacency table, said advertisement unit being adapted to advertise the metrics contained in both of said tables to the other routers of said network.

Another aspect of the present invention is directed to a unit for dynamically managing the topology of a packet network supported by a transport network allowing the dynamic creation/suppression of links for transporting packets of said packet network, said unit being adapted to command a management unit which, as a function of a metric assigned to each link of the packet network, determines the shortest path between said head end router and the tail end router of the same connection, a unit for advertising the metric assigned to each link of the packet network to the other routers of said network, and a unit for creating/destroying a link or a connection between said head end router and the tail end router of the same communication if the shortest path uses said link and the traffic between said two routers fulfills creation/destruction conditions. It is characterized in that it is adapted to:

command said management unit to create a virtual adjacency and to advertise said virtual adjacency as a link with a virtual metric if said link can be connected directly and the traffic between said two routers does not fulfill said creation/destruction conditions; and command said unit to create a real connection between said two routers and said management unit in order to create a real adjacency and to advertise said real adjacency as a link with a real metric if the traffic between said two routers fulfills said creation/destruction conditions.

Another aspect of the present invention is directed to a routing unit of a packet network supported by a transport network allowing the dynamic creation/suppression of links transporting packets of said packet network, said unit, as a function of a metric assigned to each link of the packet network, determining the shortest path between said head end router and the tail end router of the same connection and including a unit for advertising the metric assigned to each link of the packet network to the other routers of said network, said routing unit being adapted to use the method described above. It is characterized in that it includes a real adjacency management unit associated with a real adjacency table and a virtual adjacency management unit associated with a virtual adjacency table, said advertisement unit being adapted to advertise the metrics contained in both of said tables to the other routers of said network.

DETAILED DESCRIPTION OF THE DRAWINGS

The packet network to which the present invention is applied conforms to the packet networks described in the preamble of the present description.

Figure 1:
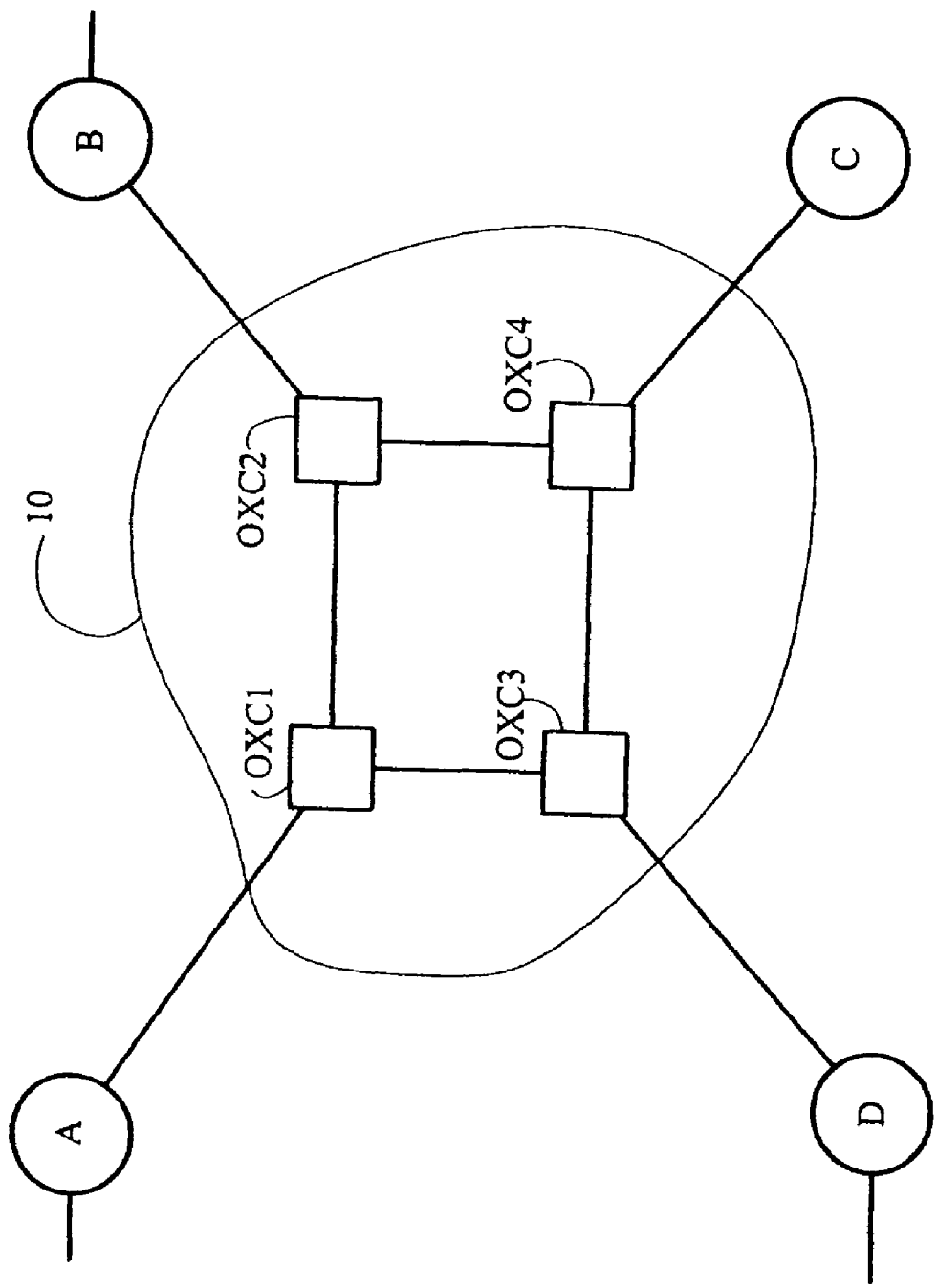
FIG. 1 is an example of a structure of a network to which the present invention can be applied.
Figure 2:
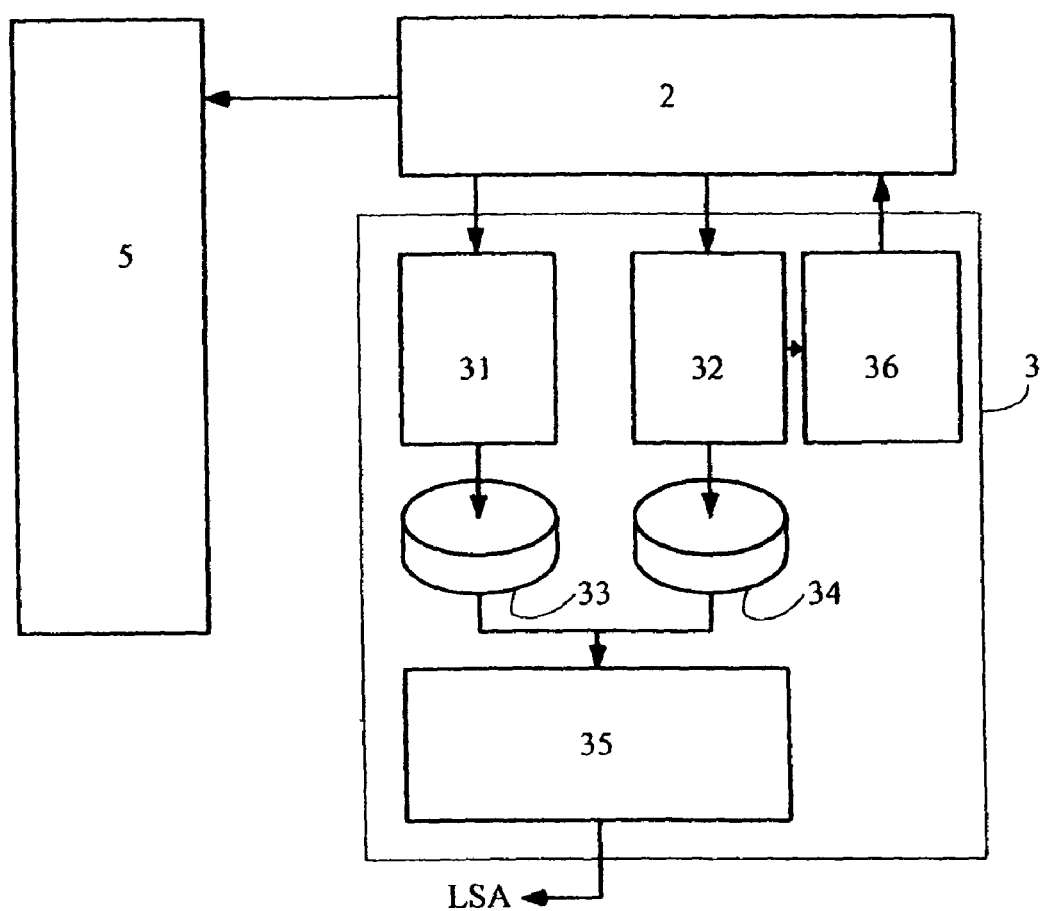
FIG. 2 is a block diagram of a system for dynamically reconfiguring the topology of a packet network that can use the method of the present invention.

The control system represented in FIG. 2 consists essentially of a unit 2 for dynamically managing the topology of the network that is functionally linked to a unit 5 for creating/destroying links in the transport network that physically transports packets of the packet network (such as the core transport network 10 from FIG. 1). It also includes an IP network link management unit 3 connected to the network topology management unit 2.

Although there is a management unit 3 in each of the routers of the network, the dynamic management unit 2 and the link creation/destruction unit 5 may be included either in each of the routers of the network or in centralized units. The routing control method of the present invention includes steps that are executed by one or the other of these units as described below.

The link creation/destruction unit 5 provides the interface between the management unit 2 and the transport network. It is a logical control interface with provision for sending signaling messages between a packet router A, B, C or D of the packet network (see FIG. 1) and optical cross-connect units OXC1 to OXC4 of a core network 10 to which it is connected for the purposes of creating, destroying, modifying, and requesting the status of optical circuits of the optical network, etc. In a preferred embodiment of the present invention, the core network 10 being an optical transport network, the interface UNI is an O-UNI interface (see the preamble of the present description).

The IP network link management unit 3 includes a real adjacency management unit 31, a virtual adjacency management unit 32, a real adjacency table 33, and a virtual adjacency table 34. It also includes a flooding unit 35 for advertising to the other routers of the packet network the status of the interfaces of the router concerned and its real and virtual adjacencies. The data that describes this state is called link state advertisement (LSA) data.

Remember that an adjacency is a link between two routers that have become neighbors for exchanging routing information, i.e. that are not only neighbors but have also synchronized their respective topology tables, referred to here as adjacency tables.

The unit 3 is a portion of an interior gateway protocol link-state (IGP link-state) type routing protocol.

The function of the unit 2 is as follows. For each router that can be connected directly to the router concerned (for example the router A from FIG. 1, which can be connected directly to the router B), the transport network topology dynamic management unit 2 requests the unit 3 to create/destroy virtual or real adjacencies and requests the unit 5 to create/destroy links between these two routers.

Figure 3:
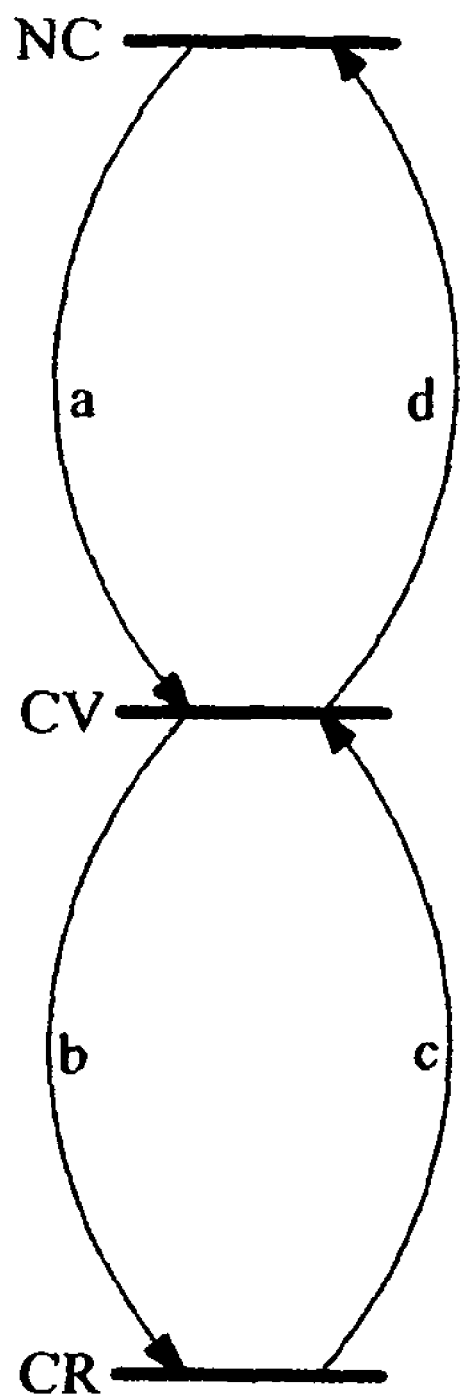
FIG. 3 shows three states that can be assumed by a packet link that is processed by the method of the present invention.

The operation of the unit 2 is explained by means of FIG. 3. In FIG. 3 three states of a link are represented: a non-connected state NC, a virtual connection state CV, and a real connection state CR.

If two routers cannot be connected directly, the link that might otherwise have linked the two routers directly is in the non-connected state NC.

If there is no active connection between two routers that can be connected directly, the unit 2 requests the unit 3 to create a virtual adjacency and to advertise it as a standard link but with a specific virtual metric Mv. The system goes to the virtual connection state CV (arrow a). The virtual adjacency management unit 32 then commands storage of the virtual metric Mv for the link concerned in the table 34.

If the unit 2 decides to set up a real connection between two routers, it requests the unit 3 to create a real adjacency and to advertise it as a standard link with the real metric Mr of said link. The link concerned goes to the real connection state CR (arrow b). The real adjacency management unit 31 then commands storage of the virtual metric Mr for the link concerned in the table 33. After a time period exceeding at least the time necessary, firstly, to create this real adjacency and, secondly, to transmit this adjacency to the other routers of the packet network (by means of the flooding unit 35), the unit 2 can request the unit 3 to suppress the virtual adjacency by having the virtual adjacency management unit 32 suppress the metric Mv from the table 34.

Note that for the other routers of the packet network the virtual adjacency to real adjacency transformation consists only in modifying the metric of the link concerned, since they have no knowledge of this virtual/real concept in relation to the link concerned.

Note further that advertising the real metric to the routers other than those at the ends of the link concerned is not necessary, and is advantageously therefore not effected, if the virtual metric chosen is larger than the real metric, given that, in this situation, that advertisement would have no impact on routing.

For the creation of the aforementioned real adjacency to be effective, the unit 2 calls on the link creation/destruction unit 5 to create said link between said two routers in the transport network.

Conversely, if the unit 2 decides to suppress the real connection between the two routers concerned, it requests the unit 3 to create a virtual adjacency and to advertise it as a standard link with the virtual metric Mv of said link. The system returns to the virtual connection state CV (arrow c). The virtual adjacency management unit 32 then commands storage of the virtual metric Mv for the link concerned in the table 34. After a time period exceeding at least that necessary, firstly, to create this virtual adjacency and, secondly, to transmit this virtual adjacency to the other routers of the packet network, the unit 2 requests the unit 3 to suppress the real adjacency by having the real adjacency management unit 31 suppress the metric Mr from the table 33.

For the creation of the aforementioned virtual adjacency to be effective, the unit 2 calls on the link creation/destruction unit 5 to suppress said link between said two routers in the transport network.

If a link between two routers is in the virtual connection state, the unit 2 advantageously triggers a process of regular verification of the real connectivity between the two end routers of the virtual adjacency. There is real connectivity when a path exists between two routers consisting of real links, i.e. when traffic can be routed directly or indirectly between these two routers. This process is handled by a connectivity unit 36. If the connectivity unit 36 detects a loss of connectivity, it informs the management unit 32 of this, which then suppresses the virtual adjacency from the table 34. For example, the connectivity unit could use a TE-LSP link between the two routers concerned. The link between the two routers returns to the non-connected state NC (arrow d).

Given that, if a link is in the connected state, the connectivity test is handled by the routing protocol (for example by the Hello protocol), the unit 2 can command the connectivity unit 36 to stop the verification of the connectivity at the time of the command to suppress a virtual adjacency from the table 34 and to create a real adjacency.

Clearly, assigning the metrics Mv and Mr to a particular link will determine the behavior of the system, in particular with regard to the impact of the creation/destruction of real links on the routing of packets of the packet network (for example IP packets). Mr(I) denotes the metric of the link I and Mc(A-B) denotes the sum of the metrics Mr(li), where li represents one of the links constituting the shortest path between the routers A and B. Mr(A-B) denotes the real metric of the link that directly links the routers A and B and Mv(A-B) denotes the virtual metric of the link directly linking the routers A and B.

Different policies for choosing the advertised values Mr and Mv are available, depending on the relative values of Mr(A-B) and Mv(A-B) and on the relative values of Mc(A-B) and Mv(A-B). In all, the following four options may be considered:

1) Mr(A-B)=Mv(A-B)=Mc(A-B)
2) Mr(A-B)=Mv(A-B)<Mc(A-B)
3) Mr(A-B)<Mv(A-B)=Mc(A-B)
4) Mr(A-B)<Mv(A-B)<Mc(A-B)

The four options depend on the value taken by the metric Mv(A-B), firstly, relative to the sum of the metrics Mc(A-B) and, secondly, relative to the real metric Mr(A-B).

The operator of the packet network chooses one policy rather than another according to whether the routing of the traffic to this link A-B is to be modified or not, before or after the creation of a real link A-B.

Figure 4A:
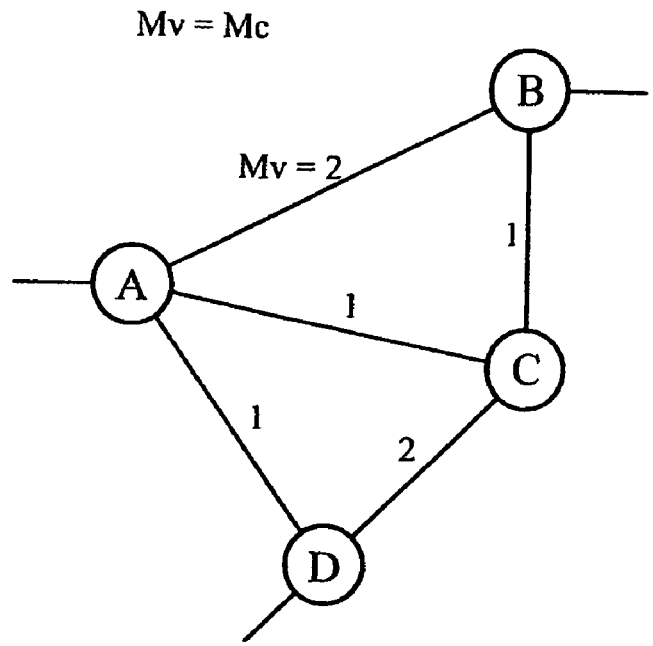
FIGS. 4a and 4b show the impact of the method of the present invention on the routing of packets in a network depending on two different choices in terms of the virtual metric allocated to a particular link of that network.
Figure 4B:
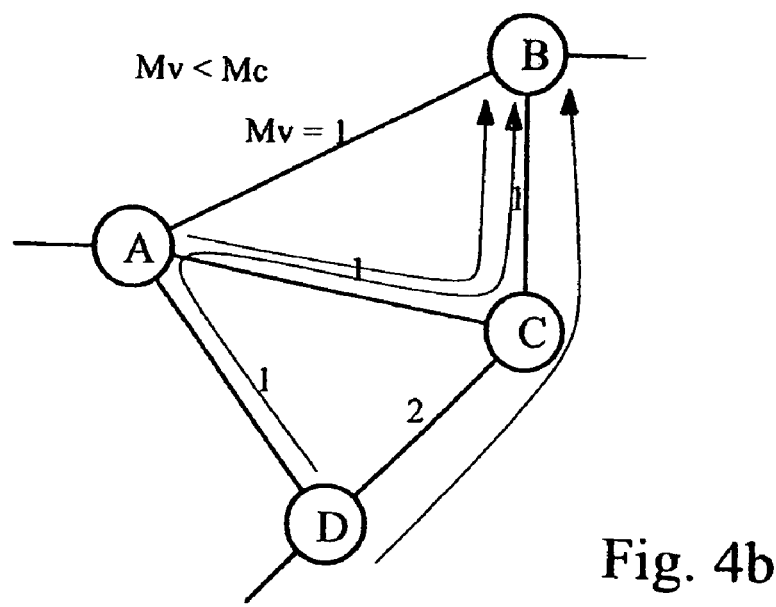

FIGS. 4*a* and 4*b* relate to a packet network consisting of four routers A, B, C, and D. The corresponding core network is not shown as this is not necessary. Two links are assumed: one from A to B, the other from D to B. At the time in question, the link between the routers A and B is provided via the router C and the link between the router D and the router B is provided via the router A and the router C.

Consider the point of view of the router A. As there is no connection between the routers A and B, a virtual adjacency AB with metric Mv is created in the table of virtual adjacencies. The link between the routers A and B is in the non-connected state in FIG. 3. The virtual adjacency created is notified to the other routers of the network, in particular to the routers C and D.

In FIG. 4*a*, the metric Mv of the virtual link between the routers A and B is equal to the metric Mc of the path ACB, i.e. is equal to 2 in the given example (the metrics assigned to the links are represented by numbers in the vicinity of the lines representing the links). Note that, for the router D, the three paths DCB, DACB and DAB have the same metric, which is equal to 3. The router D then shares its traffic between the destination of the router A and that of the router C.

Any appropriate method is used to measure the total average transmission rate on any path between the routers A and B, and therefore including traffic circulating between the routers A and B as well as traffic circulating between the routers D and B via the path DACB, for example. If this total average transmission rate rises above a transmission rate threshold, the direct link AB is created. It then carries the metric Mr. The traffic AB therefore passes over this link. The same applies to a portion of the traffic from the router D to the router B.

It is found that routing effected by the router C and by the router D (all routers with the exception of the end routers of the link concerned) is set up at the time at which the link state is declared to be the virtual connection state and is not modified after the link state changes to the real connection state. Consequently, the distribution of the traffic across the packet network is not modified after the creation of the direct link A-B and as a result of this the routing obtained by the invention is stable.

In FIG. 4*b*, the metric Mv of the virtual link between the routers A and B is smaller than the metric Mc of the path ACB, i.e. 1 in the given example. Note that, for the router D, the shortest path is the path DAB of metric equal to 2 (and not the path DCB or DACB as might have been obtained with the prior art method in which the metric Mv is not used). The router D will therefore switch its traffic to the router A. For the time being, the path taken by the traffic is therefore the path DACB.

As before, the total average transmission rate on the path between the routers A and B is measured, and therefore includes traffic circulating between the routers A and B and traffic circulating between the routers D and B via the path DACB. If this total average transmission rate is above a transmission rate threshold, the direct link AB is created. The traffic AB therefore passes over this link. The same applies to the traffic DB. Under such circumstances, before the creation of the direct link A-B, the traffic is drawn to this link, which is as yet a virtual link.

It is also found that the routing effected by the router C and by the router D (all routers with the exception of the end routers of the link concerned) is set up at the time at which the link state is declared to be the virtual connection state and is not modified after the link state changes to the real connection state. Consequently, the distribution of the traffic across the packet network is not modified after the creation of the direct link A-B. As a result of this the routing obtained by the invention is stable.

Either way, once the link A-B has been created, the metric Mr is applied to the direct link A-B. This is the real connection state CR in FIG. 3.

Given that the metric Mr is equal to the metric Mv, there is no modification of the routing after creation of the direct link A-B, apart from the routing effected by the routers A and B.

Otherwise, if the metric Mr is less than the metric Mv, the traffic is drawn to the direct link A-B. Clearly the traffic across the network is modified.

If the total average transmission rate on a link, for example the link between the routers A and B, falls below a lower threshold, that link is physically suppressed and, for these routers, the metric assigned to that link becomes a virtual metric Mv (FIG. 3 virtual connection state). If the value of this metric is higher than the value of the real metric on this link, the routing effected by the routers, in particular the routers other than the end routers (here the routers C and D), will be modified. In contrast, this will not apply if the value of the real metric is equal to the value of the virtual metric.

To be able to measure the total transmission rate of the traffic in transit between the routers A and B, it may be advantageous to set up between these two routers A and B a path known as a Traffic Engineering—Label Switching Path (TE-LSP) that aggregates all the traffic, direct or indirect, between these two routers. This particular method avoids routing traffic where particular choices of metrics could produce loops.

The invention claimed is:

1. A method of controlling routing in a packet network supported by a transport network allowing the dynamic creation/destruction of links for transporting packets of the packet network, the method comprising, for a first router:
   determining, as a function of a metric assigned to each link of the packet network, the shortest path between the first router and a second router;
   informing other routers of the packet network of the metric assigned to each link of the packet network; and
   creating/destroying a link between the first router and the second router if the first and second routers can be connected directly and traffic between the first and second routers fulfills creation/destruction conditions, the link, once created, being in a real connection state and assigned a real metric,
   wherein if the first and second routers can be directly connected but the traffic between the first and second routers does not fulfill creation conditions, the link is assigned a virtual metric, the link being in a virtual connection state, and the virtual metric assigned to the link is advertised to the other routers without indication of the virtual character of the link.

2. A method according to claim 1 for controlling routing in a packet network, wherein, when the link is in the virtual connection state, the value of the virtual metric is chosen to be either equal to or less than that of the real metric of the link.

3. A method according to claim 1 for controlling routing in a packet network, wherein, when the link is in the virtual connection state, the value of the virtual metric is chosen to be either equal to or less than that of the sum of real metrics of indirect paths linking the first and second routers.

4. A method according to claim 1 for controlling routing in a packet network, wherein a connectivity test is performed if the link is in the virtual connection state.

5. A routing management unit for managing the links of a packet network supported by a transport network allowing the dynamic creation/destruction of links for
   transporting packets of the packet network, the routing management unit determining, as a function of a metric assigned to each link of the packet network, the shortest path between a first router and a second router and advertising to the other routers of the packet network the metric assigned to each link of the packet network, the routing management unit implementing the method according to claim 1 by executing instructions stored on a non-transitory storage medium, the routing management unit comprising a real adjacency management unit associated with a real adjacency table and a virtual adjacency management unit associated with a virtual adjacency table, the routing management unit advertising the metrics contained in both of the tables to the other routers of the packet network.

6. The method according to claim 1 for controlling routing in a packet network, wherein the creation conditions for creating a link between the first and second routers is fulfilled when traffic demand between the first and second routers is above a defined upper threshold.

7. The method according to claim 1 for controlling routing in a packet network, wherein destruction conditions for destroying a link between the first and second routers is fulfilled when traffic demand between the first and second routers is below a defined lower threshold.

8. A system for controlling routing in a packet network supported by a transport network allowing the dynamic creation/destruction of links for transporting packets of the packet network, the system comprising:
   a routing management unit for determining, as a function of a metric assigned to each link of the packet network, the shortest path between a first router and a second router and to advertise the metric assigned to the link of the packet network to other routers of the packet network;
   a link creation/destruction unit for creating or destroying a link between the first router and the second router if the first and second routers can be connected directly by the link and traffic between the first and second routers fulfills creation/destruction conditions, the link creation/destruction unit providing an interface configured to send signaling messages to control a switch of the transport network; and
   a network topology management unit for commanding the link creation/destruction unit to create a link in a real connection state between the first and second routers and to command the routing management unit to create a real adjacency and to advertise the real adjacency as a link with a real metric if the first and second routers can be directly connected and the traffic between the first and second routers fulfills creation conditions;

wherein the network topology management unit commands the routing management unit to create a virtual adjacency and to advertise the virtual adjacency as a link with a virtual metric if the first and second routers can be directly connected and the traffic between the first and second routers does not fulfill the creation conditions.

9. A system according to claim 8 for controlling routing in a packet network, wherein the routing management unit includes a connectivity test unit for testing the connectivity of the link.

10. A system according to claim 8 for controlling routing in a packet network, wherein the routing management unit further comprises a real adjacency management unit associated with a real adjacency table and a virtual adjacency management unit associated with a virtual adjacency table, the routing management unit advertising the metrics contained in both of the tables to the other routers of the packet network.

11. A network topology management unit for dynamically managing the topology of a packet network supported by a transport network allowing the dynamic creation/destruction of links for transporting packets of the packet network, the network topology management unit functioning to:

command a routing management unit for determining, as a function of a metric assigned to each link of the packet network, the shortest path between a first router and a second router and to advertise to other routers of the packet network the metric assigned to each link of the packet network;

command a link creation/destruction unit for creating/destroying a link between the first router and the second router if the first and second routers can be directly connected and the traffic between the first and second routers fulfills creation/destruction conditions, the link creation/destruction unit providing an interface configured to send signaling messages to control a switch of the transport network; and command the link creation/destruction unit, if the first and second routers can be directly connected and the traffic between the first and second routers fulfills creation conditions, to create a link in a real connection state between the first and second routers and to command the routing management unit to create a real adjacency and to advertise the real adjacency as a link with a real metric;

wherein the network topology management unit commands the routing management unit to create a virtual adjacency and to advertise the virtual adjacency as a link with a virtual metric if the first and second routers can be directly connected but the traffic between the first and second routers does not fulfill the creation conditions.

12. A system for routing packets in a packet network supported by a transport network allowing the dynamic creation/destruction of links, comprising a plurality of routers of packets in the packet network, and including at least a network topology management unit according to claim 11 for dynamically managing the topology of the packet network, at least a routing management unit for managing the links of the packet network, and at least a link creation/destruction unit for creating/destroying a link between the first and second routers if the first and second routers can be directly connected and the traffic between the first and second routers fulfills creation/destruction conditions.

* * * * *